United States Patent
Lin et al.

(10) Patent No.: US 6,591,808 B2
(45) Date of Patent: Jul. 15, 2003

(54) ADAPTIVE PID CONTROL METHOD AND SYSTEM FOR INTERNAL COMBUSTION ENGINE ROTATION SPEED PULSATION DAMPING

(75) Inventors: Feng Lin, Troy, MI (US); Alexander T Zaremba, Dearborn Heights, MI (US); Bader Badreddine, Dearborn, MI (US); Jing Sun, Bloomfield Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 09/967,118

(22) Filed: Oct. 1, 2001

(65) Prior Publication Data

US 2003/0065439 A1 Apr. 3, 2003

(51) Int. Cl.[7] ............................................... F02D 31/00
(52) U.S. Cl. .................. 123/352; 123/436; 123/339.21; 123/192.1; 701/110; 701/111
(58) Field of Search ............... 123/339.14, 339.16, 123/339.18, 339.19, 339.21, 352, 436, 350, 192.1; 701/110, 111; 73/574

(56) References Cited

U.S. PATENT DOCUMENTS

| | | | | |
|---|---|---|---|---|
| 4,656,986 A | * | 4/1987 | Kull et al. | 123/436 |
| 4,699,097 A | * | 10/1987 | Tanaka et al. | 123/192.1 |
| 5,185,543 A | * | 2/1993 | Tebbe | 123/192.1 |
| 5,213,077 A | | 5/1993 | Nishizawa et al. | 123/352 |
| 5,537,967 A | * | 7/1996 | Tashiro et al. | 123/192.1 |
| 6,039,028 A | | 3/2000 | Stuntz et al. | 123/436 |
| 6,098,593 A | * | 8/2000 | Aschner | 123/436 |

OTHER PUBLICATIONS

Brandt, et al; "Adaptive Interaction And Its Application To Neural Networks"; Information Sciences 121 (1999), pp. 201–215.

Badreddine et al., Active Damping of Engine Idle Speed Oscillation by Applying Adaptive PID Control, SAE World Congress, Mar. 2001, Detroit, MI.

* cited by examiner

*Primary Examiner*—Carl S. Miller
*Assistant Examiner*—Arnold Castro

(57) ABSTRACT

Within both a method for operating an internal combustion engine and a system for operating the internal combustion engine there is provided an engine rotation speed pulsation damping within the internal combustion engine through use of a PID controller which varies a single PID control parameter, particularly, $K_D$ to provide the engine rotation speed pulsation damping within the internal combustion engine. Within both the method and the system there is also provided a pair of control algorithms for use within the PID controller such as to effect the desired engine rotation speed pulsation damping when operating the internal combustion engine.

14 Claims, 2 Drawing Sheets

ADAPTIVE PID CONTROL METHOD AND SYSTEM FOR INTERNAL COMBUSTION ENGINE ROTATION SPEED PULSATION DAMPING

BACKGROUND OF THE INVENTION

1. Field of the Invention

The present invention relates generally to design and operation of internal combustion engines. More particularly, the present invention relates to engine rotation speed pulsation damping within the design and operation of internal combustion engines.

2. Description of the Related Art

When operating internal combustion engines, and in particular when operating internal combustion engines a s employed within transportation vehicles, it is common to experience engine rotation speed pulsation. Engine rotation speed pulsation typically derives from inherent combustion pulsation characteristics when operating internal combustion engines. Similarly, engine rotation speed pulsation is undesirable when operating internal combustion engines insofar as engine rotation speed pulsation, particularly at an internal combustion engine idle speed within a transportation vehicle, contributes to transportation vehicle noise, vibration and harshness which in turn detrimentally influence customer satisfaction with a transportation vehicle.

It is thus desirable in the art of internal combustion engine design and operation to provide methods and systems that provide internal combustion engines with damped engine rotation speed pulsation.

Various methods, apparatus and systems have been disclosed within the art of internal combustion engine design and operation for providing internal combustion engines with damped engine rotation speed pulsation.

Included among the methods, apparatus and systems, but not limited among the methods, apparatus and systems, are methods, apparatus and systems disclosed within: (1) Nishizawa et al., in U.S. Pat. No. 5,213,077 (a method, an apparatus and a system that employ a fuzzy human logic inference rule set to provide for gain adjustment within a PID controller that controls an air/fuel ratio when operating an internal combustion engine in order to dampen an engine rotation speed pulsation when operating the internal combustion engine); and (2) Stuntz et al., in U.S. Pat. No. 6,039,028 (a method, an apparatus and a system which employ an algorithm comprising a pure feedback engine speed control component and a learning feedforward engine speed control component in order to dampen an engine rotation speed pulsation when operating an internal combustion engine).

Desirable in the art of internal combustion engine design and operation are additional methods, apparatus and systems that provide for engine rotation speed pulsation damping when operating internal combustion engines.

It is towards the foregoing object that the present invention is directed.

SUMMARY OF THE INVENTION

In accord with the object towards which the present invention is directed, there is provided by the present invention a method and a system that employ a PID controller to control a supplemental torque source connected to a crankshaft of an internal combustion engine, to provide to the crankshaft of the internal combustion engine a supplemental torque which in turn provides engine rotation speed pulsation damping when operating the internal combustion engine. Within the present invention, values for a desired engine rotation speed, an observed engine rotation speed and the supplemental torque supplied to an internal combustion engine are continuously supplied to the PID controller which employs a control algorithm, such as to continuously vary PID control parameters which controls the supplemental torque source, to converge the PID control parameters such as to damp an engine rotation speed pulsation within the internal combustion engine.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENTS

Figure 1:
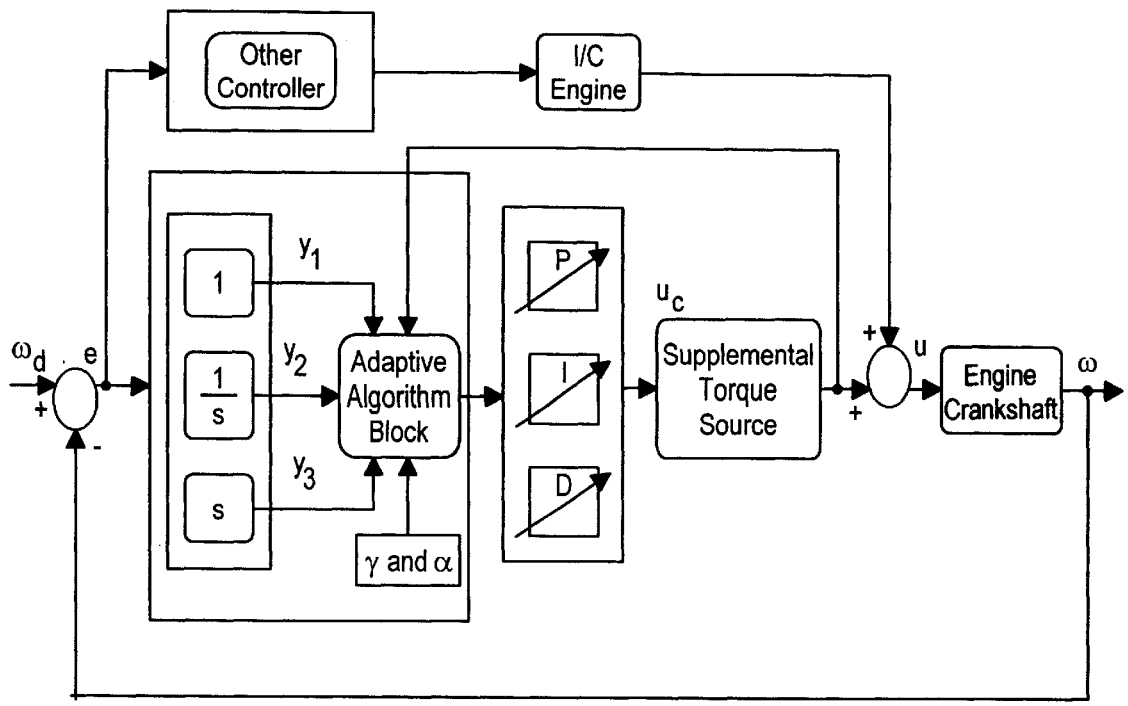
FIG. 1 shows a schematic block diagram of an internal combustion engine system in accord with a preferred embodiment of the present invention.

Referring now to FIG. 1, there is shown a schematic block diagram that illustrates various components that may be assembled into an internal combustion engine control system in accord with a preferred embodiment of the present invention.

As is shown within the schematic block diagram of FIG. 1, there is first provided an internal combustion engine 10 having connected thereto a supplemental torque source 12.

Within the preferred embodiment of the present invention with respect to the internal combustion engine 10, the internal combustion engine may be selected from the group including but not limited to reciprocating piston internal combustion engines and rotary piston internal combustion engines, where either of the foregoing two types of internal combustion engines may be fueled employing fuels including but not limited to diesel liquid fuels, gasoline liquid fuels, compressed gas fuels and vapor fuels. Although not specifically illustrated within the schematic block diagram of FIG. 1, the internal combustion engine 10 is typically and preferably assembled into a transportation vehicle, such as but not limited to a passenger transportation vehicle, a sport utility transportation vehicle, a light utility transportation vehicle or a heavy utility transportation vehicle. More typically and preferably, the present invention provides particular value within the context of a diesel liquid fuel fueled internal combustion engine assembled into any of the foregoing types of transportation vehicles.

Within the preferred embodiment of the present invention with respect to the supplemental torque source 12, the supplemental torque source 12 is connected to the internal combustion engine such as to provide a supplemental torque to a crankshaft of the internal combustion engine 10. Although any of several other inductive supplemental torque sources may be employed within the context of the present invention, the supplemental torque source 12 is typically and preferably a starter motor or starter/alternator inductive machine that may crank the crankshaft of the internal combustion engine 10.

Shown also within the schematic block diagram of FIG. 1 is a PID inputs block 14 that collects a series of PID inputs for forwarding to a PID controller 16. Similarly, and as is also illustrated within the schematic diagram of FIG. 1, the series of PID inputs is forwarded to each of the proportional P, the integral I and the derivative D components of the PID controller to provide a control command $U_C$ to the supplemental torque source 12. The PID controller is employed to control the supplemental torque source 12 which supplies the supplemental torque to the crankshaft of the internal combustion engine 10.

Within the preferred embodiment of the present invention, the specific PID inputs which are supplied to the PID inputs block 14 are at least: (1) a desired internal combustion engine 10 rotation speed $W_d$; (2) an observed internal combustion engine rotation speed w; and (3) a supplemental torque u supplied from the supplemental torque source 12 to the crankshaft of the internal combustion engine 10.

Within the context of the internal combustion engine system whose schematic block diagram is illustrated within FIG. 1, the present invention endeavors to establish an operative tuning algorithm such that there may be damped an observed internal combustion engine rotation speed w pulsation with respect to the desired internal combustion engine rotation speed $w_d$, while employing the PTD controller 16 which controls the supplemental torque source 12 which supplies a supplemental torque u to the crankshaft of the internal combustion engine 10.

In order to realize the foregoing object, the theory of adaptive interaction may be applied to the PID controller 16 to yield an adaptation algorithm, as provided in equation 1, as follows.

$$dk/dt_{i(i=P,I,D)} = -\gamma \, (dE/dw) \, o \, F[u] \, o \, y_{i(i=1,2,3)} \quad (1)$$

Within equation 1: (1) $dk/dt_{(1=P,I,D)}$; represents a series of three derivatives, one derivative for each of the series of three PID control parameters $K_p$, $K_I$ and $K_o$; (2) $\gamma$ is an adaptation gain; (3) dE/dw is a derivative of a performance index (as defined below) with respect to observed internal combustion engine rotation speed; (4) o denotes composition; (5) F[u]=dw/du, where $F_4$ represents the supplemental torque input/engine rotation speed output relation of the internal combustion engine and F is a Frechet derivative of F; and (5) $Y_{i(2=1,2,3)}$ represents, the error (e=$w_d$-w), the integral of the error and the derivative of the error within the PID inputs block 14 as illustrated within the schematic block diagram of FIG. 1.

The basis for equation 1 may be found within any of several texts relating to adaptive control methodology (see, e.g. Brandt, et al., "Adaptive Interaction And Its Application To Neural Networks", Information Sciences 121 (1999), pp 201–215.) Similarly, Frechet derivatives are generally also conventional within the context of mathematical control algorithms and are further discussed in several texts (see, e.g. D. G. Luemberger,"Optimization By Vector Space Methods", Wiley, New York, 1968).

In accord with equation 1, and within the context of the present invention, the performance index E against which the engine rotation speed pulsation damping goal of the present invention may be measured, is provided in equation 2, as follows.

$$E = e^2 + \alpha_1 u^2 = (w_d - w)^2 + \alpha_1 u^2 \quad (2)$$

Within equation 2, $\alpha_1$ is an empirically determined weighting coefficient. The present invention seeks to minimize, in an adaptive fashion, the performance index E as given in equation 2 (i.e., minimize a difference between desired and observed engine rotation speed while also minimizing supplemental torque) in order to damp engine rotation speed pulsation within an internal combustion engine.

In accord with equation 2, a derivative of the performance index as a function of observed engine rotation speed is provided by equation 3, as follows.

$$dE/dw = 2e(de/dw) + 2\alpha_1 u(du/dw) \quad (3)$$

Since e=$w_d$-w, equation 3 may be derived to yield equation 4, as follows.

$$dE/dw = -2e + 2\alpha_1 u(1/(dw/du)) \quad (4)$$

Since F[u] dw/du, equation 4 may be derived to yield equation 5, as follows.

$$dE/dw = -2e + 2\alpha_1 u(1/(F[u])) \quad (5)$$

In order to determine the PID controller coefficients $K_p$, $K_I$ and $K_D$, one incorporates equation 5 into equation 1, and with the further recognition that $F[u]oy_{i(i=1,2,3)} = g(t) * y_{i(i=1,2,3)}$, where g(t) equals the internal combustion engine impulse response to the supplemental torque as a function of time and * denotes convolution equation 6 results, as follows.

$$\frac{d \, K_{i(i=P,I,D)}}{dt} = 2\gamma_1(e(g(t) * y_{i(i=1,2,3)}) - \alpha_1 u y_{i(i=1,2,3)}) \quad (6)$$

Figure 2:
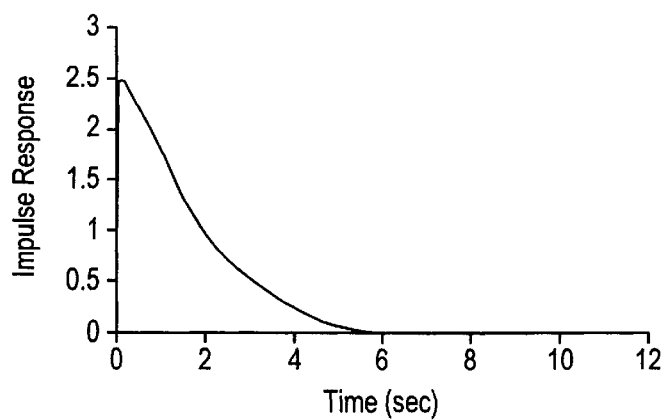
FIG. 2 shows a diagram of Impulse Response of engine speed to supplemental torque as a function of time for a typical internal combustion engine in accord with the present invention.

Presuming that an internal combustion engine has a nominally smooth impulse response to a supplemental torque as illustrated in FIG. 2, the PID parameters $K_p$, $K_I$ and $K_D$ may be further approximated in accord with equation 7, as follows.

$$dk/dt_{i(i=P,I,D)} = 2\gamma_2 \, (ey_{i(i=1,2,3)} - \alpha_2 u y_{i(i=1,2,3)}) \quad (7)$$

Within equation 7 in comparison with equation 6, $\gamma_1$ and $\gamma_2$ are related by the same proportionality coefficient as $\alpha_1$ and $\alpha_2$.

As is seen from equation 6 and equation 7, it is thus desirable to select a value of $\alpha_1$ and/or $\alpha_2$ such that each of the PID control parameters $K_p$, $K_I$ and $K_D$ converges to a fixed value such as to optimally control engine rotation speed pulsation within an internal combustion engine.

In practice, however, no one single value of $\alpha_1$ and/or $\alpha_2$ can apparently be determined such as to effect that result. Similarly, it was also determined, in part in accord with the graphs that correspond with FIG. 3 and FIG. 4, that $K_D$ has a greater influence with respect to engine rotation speed pulsation damping than $K_p$ and (although not specifically illustrated graphically within either FIG. 3 or FIG. 4) $K_I$. The graphs that correspond with FIG. 3 and FIG. 4, as well as with FIG. 5 and FIG. 6, were obtained from measurements of performance of a 1.8 liter indirect diesel fuel injected engine to which was connected an 8 kilowatt starter/alternator induction machine as a supplemental torque source.

Figure 3:
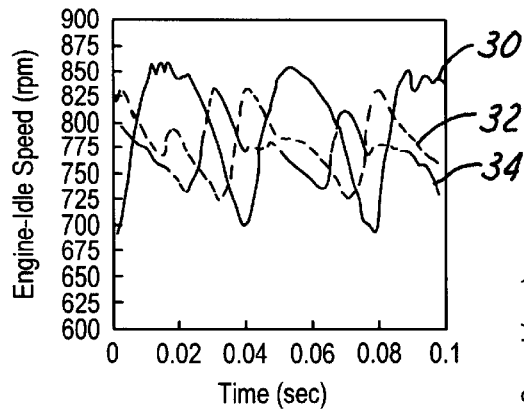
FIG. 3 and FIG. 4 show a pair of diagrams of Engine Idle Speed versus Time illustrating engine rotation speed pulsation damping in accord with the present invention.
Figure 4:
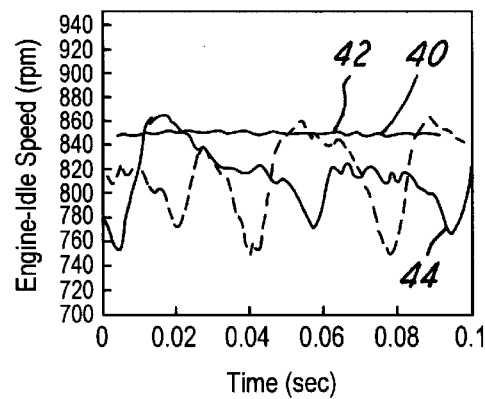

Within FIG. 3, there is illustrated the results of increasing $K_p$ from 5 to 60 to 140, in accord with the curves that correspond with reference numerals 30, 32 and 34, while both $K_D$ and $K_I$ are held constant at zero. Within FIG. 4, there is illustrated the results of increasing $K_D$ from 7 to 22 to 35 in accord with the curves that correspond with reference numerals 40, 42 and 44, while $K_p$ is held constant at 5 and $K_I$ is held constant at zero. It is clearly seen from the graphs of FIG. 3 and FIG. 4 that smaller increases in values of $K_D$, in comparison with increases in values of $K_p$, provide effective engine rotation speed pulsation damping.

Thus, it was also experimentally determined in accord with the preferred embodiment of the present invention to optimize $\alpha_1$ and/or $\alpha_2$ with respect only to $K_D$ (and not $K_p$ or $K_I$) such that an adaptive PID controller could be developed for engine rotation speed pulsation damping in accord with the present invention. Upon further experimental evaluation, optimal convergence of $K_D$ was obtained for a value of $\alpha_1$ of from about 1E-4 to about 1E-7, more preferably from about 1E-5 to about 1E-6 and most preferably about 5.5E-6 and for an adaptation gain $\gamma_1$ of from about 100 to about 1200, more preferably from about 300 to about 800 and most preferably about 500 while employing the control algorithm as provided in equation 6. In the alternative, optimal convergence of $K_D$ was obtained for a value of $\alpha_2$ of 1E-1 to about 1E-3, more preferably from about 1E-1 to about 1E-2 and most preferably about 0.04 and for an adaptation gain $\gamma_2$ of from about 0.01 to about 5, more preferably from about 0.01 to about 2 and most preferably about 1, while employing the approximation control algorithm as provided in equation 7.

Figure 5:
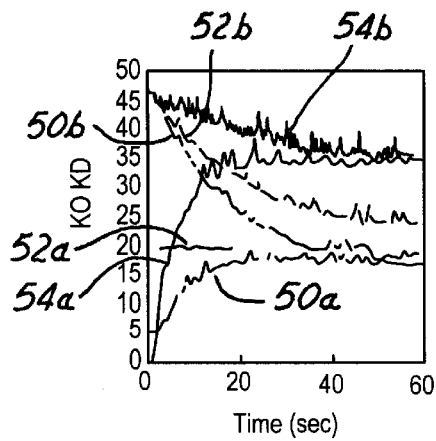
FIG. 5 shows a graph of $K_D$ versus Time illustrating convergence of $K_D$ under various internal combustion engine idle speeds in accord with the present invention.

Shown in FIG. 5 is a graph of $K_D$ versus time for three separate engine rotation speeds, where $K_D$ for a PID controller is initially set at either zero or 45 for the diesel internal combustion engine controlled with respect only to a variation in $K_D$ while employing the control algorithm of equation 6, with $\alpha_1$=5.5E-6 and $\gamma_1$=500, in accord with the above. As is shown in the graph of FIG. 5 with respect to the curves that correspond with reference numerals 50a and 50b, and for an internal combustion engine rotation speed of 1150 revolutions per minute, $K_D$ bidirectionally converges to a value of about 17. Similarly, and as is also shown in the graph of FIG. 5 with respect to the curves that correspond with reference numerals 52a and 52b, and for an internal combustion engine rotation speed of 1050 revolutions per minute, $K_D$ bidirectionally converges to a value of about 22. Finally, and as is also shown in the graph of FIG. 5 with respect to the curves that correspond with reference numerals 54a and 54b, and for an internal combustion engine rotation speed of 850 revolutions per minute, $K_D$ bidirectionally converges to a value of about 35.

Figure 6:
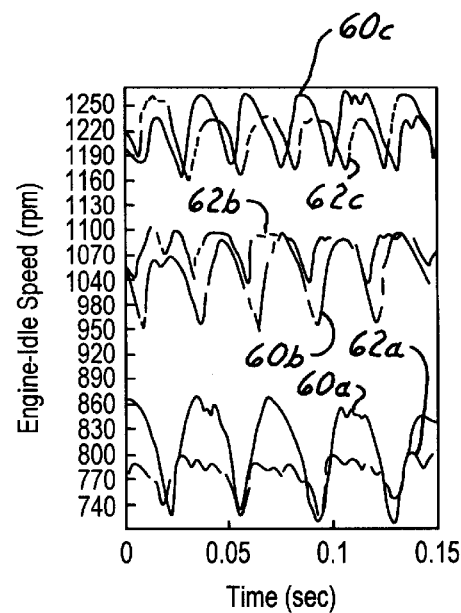
FIG. 6 shows a graph of Engine Idle Speed versus Time illustrating engine rotation speed pulsation damping for different idle speed in accord with the present invention.

Finally, there is shown in FIG. 6 a diagram of Engine Idle Speed versus Time for the three engine idle speeds as illustrated within the graph of FIG. 5, namely 850, 1050 and 1150 revolutions per minute. Within the graph of FIG. 6, the curves that correspond with reference numerals 60a, 60b and 60c correspond with engine rotation speed absent a supplemental applied torque, while the curves that correspond with references numerals 62a, 62b and 62c correspond with engine rotation speed obtained with a supplemental applied torque in accord with the converged values of $K_D$ as illustrated within the graph of FIG. 5.

As is seen from review of the data within FIG. 6, there is observed engine rotation speed pulsation damping at each of the three engine rotation speeds in accord with FIG. 6, but such engine rotation speed pulsation damping is particularly pronounced (i.e., about 65 percent reduction) at the lower engine rotation speed of 850 revolutions per minute.

Upon assembling a supplemental torque source to an internal combustion engine and controlling the same while employing a PID controller in accord with the control algorithm as provided within equation 6 or equation 7, there is provided in accord with the present invention an engine rotation speed pulsation damping within the internal combustion engine. Such engine rotation speed pulsation damping may be realized while adaptively and analytically adjusting a single PID control parameter, particularly a single $K_D$ control parameter, within the PID controller.

As is understood by a person skilled in the art, the preferred embodiment of the present invention is illustrative of the present invention rather than limiting of the present invention. Revisions and modifications may be made to components and apparatus as are employed within the context of the preferred embodiment of the present invention while still providing a method in accord with the present invention and a system in accord with the present invention, further in accord with the accompanying claims.

What is claimed is:

1. A method for operating an internal combustion engine comprising:

providing an internal combustion engine having assembled thereto an engine rotation speed sensor and a supplemental torque source that is controlled by a PID controller;

determining continuously, while operating the internal combustion engine, input values for at least a desired internal combustion engine rotation speed, an observed internal combustion engine rotation speed and a supplemental torque supplied by the supplemental torque source and inputting those input values to the PID controller;

adjusting continuously, through operation of a control algorithm within the PID controller with respect to the input values, a single PID control parameter to control the supplemental torque source such as to damp an engine rotation speed pulsation within the internal combustion engine.

2. The method of claim 1 wherein the single PID control parameter is $K_D$.

3. The method of claim 1 wherein the control algorithm is given by the equation:

$$dk/dt_{i(i=P,I,D)} = 2\gamma_1(e(g(t)*Y_{i(i=1,2,3)}) - \alpha_1 u y_{i(i=1,2,3)})$$

where $dk/dt_{i(i=P,I,D)}$ is the derivative of a PID control parameter, $\gamma_1$ is an adaptation coefficient, e equals the desired engine rotation speed minus the observed engine rotation speed, g(t) is the internal combustion engine impulse response to a supplemental torque, * denotes convolution, $\alpha_1$ is an empirically determined coefficient, u is supplemental torque and $y_{i(i=1,2,3)}$ represents the output of the proportional, integral or derivative transfer function blocks for the PID controller.

4. The method of claim 3 wherein $\gamma_1$ is from about 100 to about 1200 and $\alpha_1$ is from about 1E-4 to about 1E-7.

5. The method of claim 1 wherein the control algorithm is given by the equation:

$$dk/dt_{i(i=P,I,D)} = 2\gamma_2(e y_{i(i=1,2,3)} - \alpha_2 u y_{i(i=1,2,3)})$$

where $dk/dt_{i(i=P,I,D)}$ is the derivative of a PID control parameter, $\gamma_2$ is an adaptation coefficient, e equals the desired engine rotation speed minus the observed engine rotation speed, $k_2$ is an empirically determined coefficient, u is supplemental torque and $y_{i(i=1,2,3)}$ represents the output of the proportional, integral or derivative transfer function blocks for the PID controller.

6. The method of claim 5 wherein $\gamma_2$ is from about 0.01 to about 5 and $\alpha_2$ is from about 1E-1 to about 1E-3.

7. The method of claim 1 wherein the internal combustion engine is assembled within a transportation vehicle.

8. A system for operating an internal combustion engine comprising:
   an internal combustion engine having assembled thereto an engine rotation speed sensor and a supplemental torque source;
   a PID controller controlling the supplemental torque source, the PID controller having as inputs at least a desired internal combustion engine rotation speed, an observed internal combustion engine rotation speed and a supplemental torque, the PID controller being programmed with a control algorithm which operates upon the inputs to vary a single PID control parameter with respect to control of the supplemental torque source such as to damp an engine rotation speed pulsation within the internal combustion engine when operating the internal combustion engine.

9. The system of claim 8 wherein the single PID control parameter is $K_D$.

10. The system of claim 8 wherein the control algorithm is given by the equation:

$$dk/dt_{i(i=P,I,D)} = 2\gamma_1(e \times (g(t)^* y_{i(i=1,2,3)}) - \alpha_1 u y_{i(i=1,2,3)}$$

where $dk/dt_{i(i=P,I,D)}$ is the derivative of a PID control parameter, $\gamma_1$ is an adaptation coefficient, e equals the desired engine rotation speed minus the observed engine rotation speed, g(t) is the internal combustion engine impulse response to a supplemental torque, * denotes convolution, $\alpha_1$ is an empirically determined coefficient, u is supplemental torque and $y_{i(i=1,2,3)}$ represents the output of the proportional, integral or derivative transfer function blocks for the, PID controller.

11. The system of claim 10 wherein $\gamma_1$ is from about 100 to about 1200 and $\alpha_1$ is from about 1E-4 to about 1E-7.

12. The system of claim 8 wherein the control algorithm is given by the equation:

$$dk/dt_{i(i=P,I,D)} = 2\gamma_2(e y_{i(i=1,2,3)} - k_2 u y_{i(i=1,2,3)})$$

where $dk/dt_{i(i=P,I,D)}$ is the derivative of a PID control parameter, $\gamma_2$ is an adaptation coefficient, e equals the desired engine rotation speed minus the observed engine rotation speed, $k_2$ is an empirically determined coefficient, u is supplemental torque and $y_{i(i=1,2,3)}$ represents the output of the proportional, integral or derivative transfer function blocks for the PID controller.

13. The system of claim 12 wherein $\gamma_2$ is from about 0.01 to about 5 and $\alpha_2$ is from about 1E-1 to about 1E-3.

14. The system of claim 8 wherein the internal combustion engine is assembled within a transportation vehicle.

* * * * *